(12) United States Patent
Newlin

(10) Patent No.: US 9,431,838 B2
(45) Date of Patent: Aug. 30, 2016

(54) APPARATUSES AND RELATED METHODS FOR CHARGING CONTROL OF A SWITCHING VOLTAGE REGULATOR

(71) Applicant: Integrated Device Technology, Inc., San Jose, CA (US)

(72) Inventor: Trevor Newlin, Laguna Hills, CA (US)

(73) Assignee: INTEGRATED DEVICE TECHNOLOGY, INC., San Jose, CA (US)

( * ) Notice: Subject to any disclaimer, the term of this patent is extended or adjusted under 35 U.S.C. 154(b) by 569 days.

(21) Appl. No.: 13/836,165

(22) Filed: Mar. 15, 2013

(65) Prior Publication Data

US 2014/0266010 A1 Sep. 18, 2014

(51) Int. Cl.
*H02J 7/00* (2006.01)

(52) U.S. Cl.
CPC ...... *H02J 7/0052* (2013.01); *H02J 2007/0059* (2013.01)

(58) Field of Classification Search
CPC ..... Y02E 60/12; H02J 7/0042; H02J 7/0045; H01M 10/10; H01M 10/46
USPC .......................................................... 320/107
See application file for complete search history.

(56) References Cited

U.S. PATENT DOCUMENTS

| 5,625,275 | A | * | 4/1997 | Tanikawa | H02J 7/0068 320/160 |
| 6,104,165 | A | * | 8/2000 | Miyamoto | H01M 10/44 320/125 |
| 6,166,527 | A | * | 12/2000 | Dwelley | H02M 3/1582 323/222 |
| 6,462,521 | B1 | | 10/2002 | Yang et al. | |
| 9,059,594 | B2 | * | 6/2015 | Liu | H02J 7/007 |
| 2002/0084772 | A1 | * | 7/2002 | Ruha | G01R 31/3606 320/162 |
| 2006/0043955 | A1 | * | 3/2006 | Hung | H02M 3/158 323/283 |
| 2007/0216388 | A1 | * | 9/2007 | Sohma | H02M 3/156 323/284 |
| 2010/0156369 | A1 | * | 6/2010 | Kularatna | G05F 1/46 323/282 |
| 2010/0328831 | A1 | * | 12/2010 | Zhang | H02M 1/32 361/93.1 |
| 2012/0223682 | A1 | * | 9/2012 | Hussain | H02J 7/0073 320/164 |
| 2014/0084887 | A1 | * | 3/2014 | Sahu | H02M 3/158 323/283 |

OTHER PUBLICATIONS

Intersil, "Microprocessor CORE Voltage Regulator Multi-Phase Buck PWM Controller", Data Sheet, HIP6301, pp. 1-17, © 2000, 2002, 2004 Intersil Americas Inc., Dec. 27, 2004.

(Continued)

*Primary Examiner* — Richard Isla Rodas
*Assistant Examiner* — Mohammed J Sharief
(74) *Attorney, Agent, or Firm* — Haynes and Boone LLP

(57) ABSTRACT

Charging systems and related methods are disclosed for switching voltage regulators. A charging controller may be configured to generate a control signal indicating a first level of an output current generated by a switching voltage regulator for charging an energy storage device, determine that an output voltage exceeded a predetermined threshold, and generate the control signal indicating a new level of the output current that is reduced from the first level. A method of controlling charging of an energy storage device may comprise monitoring an output voltage charging an energy storage device, comparing a reference signal and a current sense signal to generate a PWM control signal that determines an output current for a switching voltage regulator generating the output voltage, and decrementing the reference signal in response to the output voltage exceeding a predetermined level for a maximum charging voltage for the energy storage device.

20 Claims, 5 Drawing Sheets

(56) References Cited

OTHER PUBLICATIONS

Intersil, "Single-Phase Buck PWM Controller with Integrated High Speed MOSFET Driver and Pre-Biased Load Capability", Data Sheet, ISL6540, pp. 1-20, © 2006, 2008 Intersil Americas Inc., Jul. 23, 2008.

Intersil, "Synchronous Rectified MOSFET Driver with Pre-Biased Load Startup Capability", Data Sheet, ISL6608, pp. 1-11, © 2004 Intersil Americas Inc., Mar. 2004.

Patella et al., "High-Frequency Digital PWM Controller IC for DC/DC Converters", pp. 1-27, Department of Electrical and Computer Engineering, University of Colorado.

* cited by examiner

APPARATUSES AND RELATED METHODS FOR CHARGING CONTROL OF A SWITCHING VOLTAGE REGULATOR

FIELD

Embodiments of the present disclosure relate generally to power charging control using switching voltage regulators and, more particularly, to apparatuses and related methods for charging energy storage devices used as primary and back-up power supplies.

BACKGROUND

Charging systems for energy storage devices often use voltage regulators, such as switching voltage regulators and linear regulators. Due to the high effective series resistance (ESR) of most energy storage devices (e.g., batteries), the charging voltage may experience an overvoltage that rises above the maximum voltage desired for the charging voltage. As a result, the lifespan of the energy storage device may be shortened due to the overvoltage condition over time. Linear regulators generally reduce the overvoltage condition by charging according to a constant current/constant voltage charging method. Linear regulators, however, tend to have a relatively high power dissipation and slow charging times.

BRIEF SUMMARY

Embodiments of the present disclosure include a charging system comprising a charging controller. The charging controller is configured to generate a control signal indicating a first level of an output current generated by a switching voltage regulator for charging an energy storage device, determine that an output voltage exceeded a predetermined threshold, and generate the control signal indicating a new level of the output current that is reduced from the first level.

Another embodiment of the present disclosure includes charging system comprising a charging controller including a plurality of mixed analog and digital circuits configured to monitor an output voltage and an output current from an energy storage device, and control a switching voltage regulator to reduce the output current in response to the output voltage exceeding a predetermined threshold.

Another embodiment of the present disclosure includes a method of controlling charging of an energy storage device. The method comprises monitoring an output voltage charging an energy storage device, comparing a reference signal and a current sense signal to generate a PWM control signal that determines an output current for a switching voltage regulator generating the output voltage, and decrementing the reference signal in response to the output voltage exceeding a predetermined level for a maximum charging voltage for the energy storage device.

Another embodiment of the present disclosure includes a method of charging an energy storage device. The method comprises generating a charging output current as a constant current with a switching voltage regulator during a first period while a charging output voltage rises, and decrementing the charging output current during a second period. Decrementing occurs in a step-by-step manner responsive to the charging output voltage rising above a predetermined threshold.

DETAILED DESCRIPTION

Figure 1:
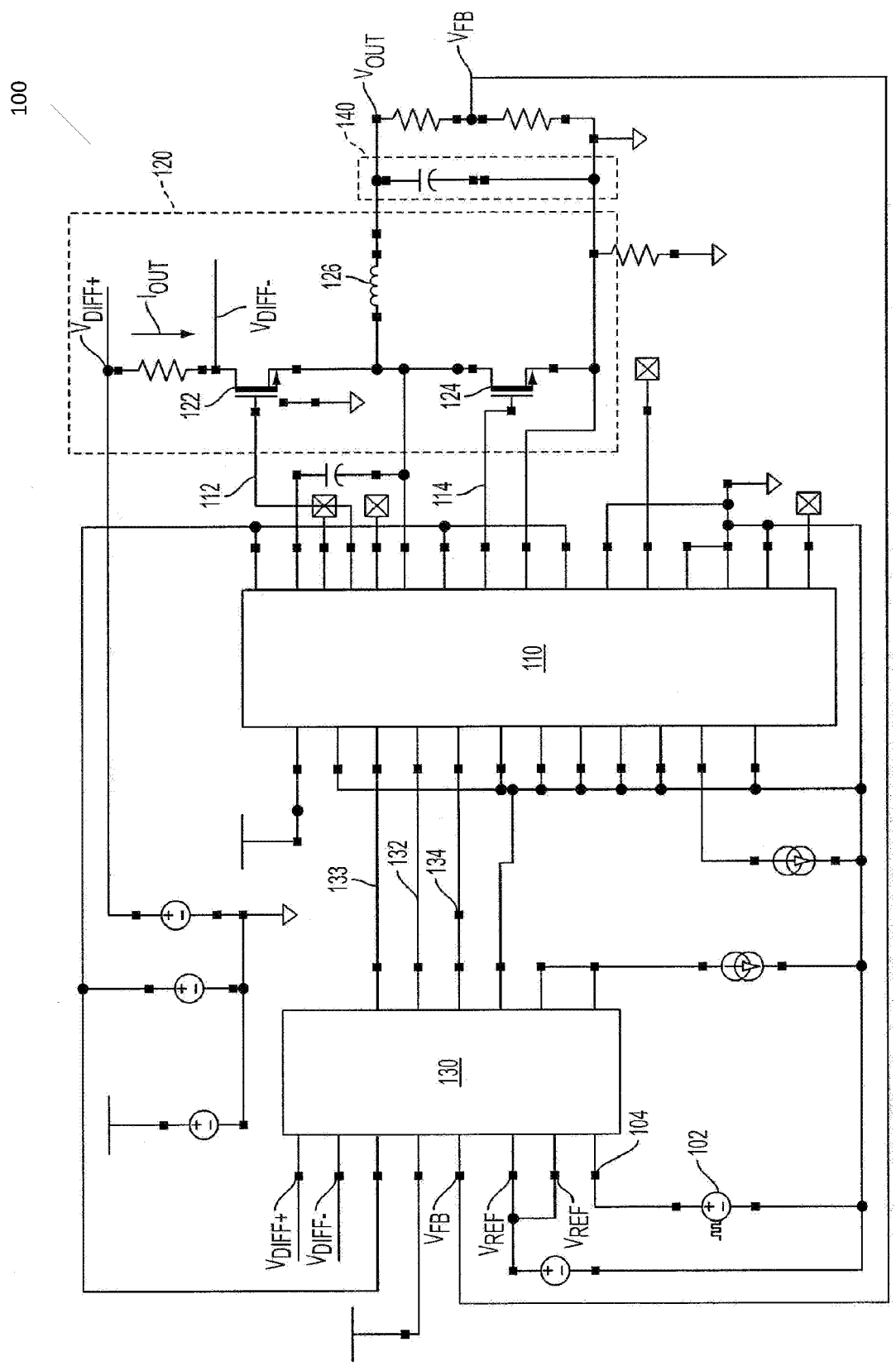
FIG. 1 is a schematic block diagram of a charging system according to an embodiment of the present disclosure.

In the following description, reference is made to the accompanying drawings in which is shown, by way of illustration, specific embodiments of the present disclosure. Other embodiments may be utilized and changes may be made without departing from the scope of the disclosure. The following detailed description is not to be taken in a limiting sense, and the scope of the present invention is defined only by the appended claims.

Furthermore, specific implementations shown and described are only examples and should not be construed as the only way to implement or partition the present disclosure into functional elements unless specified otherwise herein. It will be readily apparent to one of ordinary skill in the art that the various embodiments of the present disclosure may be practiced by numerous other partitioning solutions.

In the following description, elements, circuits, and functions may be shown in block diagram form in order not to obscure the present disclosure in unnecessary detail. Additionally, block definitions and partitioning of logic between various blocks is exemplary of a specific implementation. It will be readily apparent to one of ordinary skill in the art that the present disclosure may be practiced by numerous other partitioning solutions. Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

Also, it is noted that the embodiments may be described in terms of a process that may be depicted as a flowchart, a flow diagram, a structure diagram, or a block diagram. Although a process may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed or that the first element must precede the second element in some manner. In addition, unless stated otherwise, a set of elements may comprise one or more elements.

Embodiments of the present disclosure include an apparatus, system, and/or method for controlling charging of an energy storage device. Examples of energy storage devices for which the charging may be applied to include capacitors (e.g., supercapacitors, electrolytic capacitors, etc.), batteries (e.g., Li-ion, NiMH, etc.), and other similar devices configured to receive a power signal generated by a charging system, and which may be charged therewith. A supercapacitor may be an electrochemical capacitor that includes double-layer electrodes that have a capacitance value determined by a double-layer capacitance and pseudocapacitance. Supercapacitors may include double-layer capacitors, pseudocapacitors, hybrid capacitors. Double-layer capacitors include electrochemical capacitors in which the static double-layer capacitance is much higher than the faradaic pseudocapacitance. Pseudocapacitors include electrochemical capacitors in which the faradaic pseudocapacitance is much higher than the static double-layer capacitance. Hybrid capacitors include capacitors with electrodes that exhibit significant double-layer capacitance and pseudocapacitance.

Embodiments of the present disclosure may enable constant current charging and overvoltage protection, which may achieve one or more improvements over conventional charging systems with respect to the equivalent series resistance (ESR) tolerance, charging speed, battery/capacitor protection, capacitor/battery life, among other potential improvements. For example, embodiments of the present disclosure may be performed without external compensation components (digital or analog), and may enable safe charging with relatively fast speeds without overvoltage on the energy storage device. Without additional compensation components, the cell type size and the harness resistance may be more flexible. In some embodiments, the charging system may be implemented using mixed analog and digital components and techniques.

FIG. 1 is a schematic block diagram of a charging system 100 according to an embodiment of the present disclosure. The charging system 100 includes a driver 110, a switching voltage regulator 120, and a charging controller 130. The switching voltage regulator 120 may be coupled to a load 140. In some embodiments, each of the driver 110, the switching voltage regulator 120, and the charging controller 130 may be their own discrete integrated circuit (IC) chip. As a result, to perform the charging, each individual IC chip may be have input pins and output pins that are coupled together to perform the various charging operations described herein. In some embodiments, more than one of the gate drivers 110, the switching voltage regulator 120, and the charging controller 130 may be integrated within the same IC chip (including an embodiment that includes all three). The load 140 may include an energy storage device, such as a capacitor (e.g., supercapacitors, electrolytic capacitors), a battery (e.g., Li-ion, NiMH, etc.), etc.

The switching voltage regulator 120 may be configured to regulate (e.g., convert) an incoming voltage to an output voltage of a desired level (e.g., a DC-DC converter). The switching voltage regulator 120 may include transistors (FETs) 122, 124, and inductor 126 coupled to each other in a synchronous buck converter configuration (as shown) or other converter configuration (e.g., buck/boost converter topology).

The driver 110 may be configured to generate the switching signals 112, 114 that control the switching voltage regulator 120 at a high switching frequency. The driver 110 may be configured to drive the gates of the high-side transistor 122 and the low-side transistor 124 to perform the desired voltage regulation operation according to the configuration of the switching voltage regulator 120 (which is a buck converter topology in FIG. 1). For example, a first switching signal 112 may be the high-side drive signal and a second switching signal 114 may be the low-side drive signal for the switching voltage regulator 120. The driver 110 may be configured to have a diode emulation mode. During diode emulation mode, the driver 110 may be protected from negative current from the switching voltage regulator 120. In addition, the charging controller 130 may not need to detect zero current for shut off.

The charging controller 130 is coupled to the driver 110 and configured to control the driver 110. The charging controller 130 is configured to generate a control signal 132 that is sent to the driver 110 to control the driver 110 to operate the switching voltage regulator 120 to generate the desired output voltage ($V_{OUT}$) and output current ($I_{OUT}$). The control signal 132 may be a low-power pulse-width modulation (PWM) signal. As discussed above, the driver 110 generates the higher-power switching signals 112, 114 to drive the gates of the transistors 122, 124 of the switching voltage regulator 120 according to switching frequency determined based on the PWM signal 132. The charging controller 130 may receive a clock signal 104 from a clock generator 102. The clock signal 104 may be used to set the frequency of the PWM signal 132.

The charging controller 130 may be configured to control the driver 110 to generate the appropriate switching signals 112, 114, such that the output current ($I_{OUT}$) decrements to a new level as the output voltage ($V_{OUT}$) increases to an overvoltage state that exceeds a predetermined threshold. The charging controller 130 may receive a feedback voltage ($V_{FB}$), which may indicate the level of the output voltage ($V_{OUT}$) for the charging controller 130 to determine whether the output voltage ($V_{OUT}$) has exceeded the predetermined threshold. In some embodiments, the feedback voltage ($V_{FB}$) may be the output voltage ($V_{OUT}$) itself, while in other embodiments the feedback voltage ($V_{FB}$) may simply be derived from the output voltage ($V_{OUT}$). For example, as shown in FIG. 1, the feedback voltage ($V_{FB}$) may be a voltage at a node from within voltage divider coupled to the node of the output voltage ($V_{OUT}$). Thus, the feedback voltage ($V_{FB}$) can be used to monitor the output voltage ($V_{OUT}$) for determining whether the output voltage ($V_{OUT}$) exceeds a predetermined threshold. The predetermined threshold may be determined by a reference voltage ($V_{REF}$) received by the charging controller 130. Because the reference voltage ($V_{REF}$) may be used as a reference for the feedback voltage ($V_{FB}$), the reference voltage some value that is may be the expected voltage for the feedback voltage ($V_{FB}$) when the output voltage ($V_{OUT}$) is at the predetermined threshold.

The charging controller 130 may further receive differential voltages ($V_{DIFF+}$, $V_{DIFF-}$) that may be used to sense the output current ($I_{OUT}$). For example, the charging controller 130 may determine a voltage difference between the differential voltages ($V_{DIFF+}$, $V_{DIFF-}$) that is used as an indication of the present level of the output current ($I_{OUT}$).

Each time that the output current ($I_{OUT}$) decrements, the output voltage ($V_{OUT}$) may temporarily drop as well; however, as the load 140 continues charging, the output voltage ($V_{OUT}$) may increase again to an overvoltage level. As the output voltage ($V_{OUT}$) reaches an overvoltage level that again exceeds the predetermined threshold, the charging controller 130 may be configured to again decrement the output current ($I_{OUT}$) to a new level. This cycle of decrementing the output current ($I_{OUT}$) may continue as the output voltage ($V_{OUT}$) increases above predetermined threshold until a minimum output current ($I_{OUT}$) is reached. As a result, from the perspective of the energy storage device 140, it may appear as if the charging is being performed by a linear voltage regular rather than a switching voltage regulator. In particular, there is a constant output current ($I_{OUT}$) while the output voltage ($V_{OUT}$), followed by the output current ($I_{OUT}$) decreasing while the output voltage ($V_{OUT}$) is held substantially constant. In comparison with a conventional linear regulator, embodiments of the present disclosure may be more efficient and provide a faster charge (e.g., 30%-40% faster) for the same charging current.

The charging system 100 may also include an electronic device that includes the driver 110, the switching voltage regulator 120, the charging controller 130. The electronic device may include other components, such as an input device, an output device, a processor, memory, etc. for operation thereof. Exemplary electronic devices include mobile devices, such as smart phones, cell phones, tablet computers, laptop computers, electronic readers, cameras, and other similar devices that are powered by energy storage devices that may require charging. Of course, electronic devices may also include non-mobile devices that are powered by energy storage devices, such as personal computers, or other devices that may employ energy storage devices for primary or back up power. For example, on-board (e.g., motherboard) back-up power supplies may need to be charged quickly to be fully charged before work is performed, such that employing embodiments of the present disclosure may be advantageous.

Figure 2:
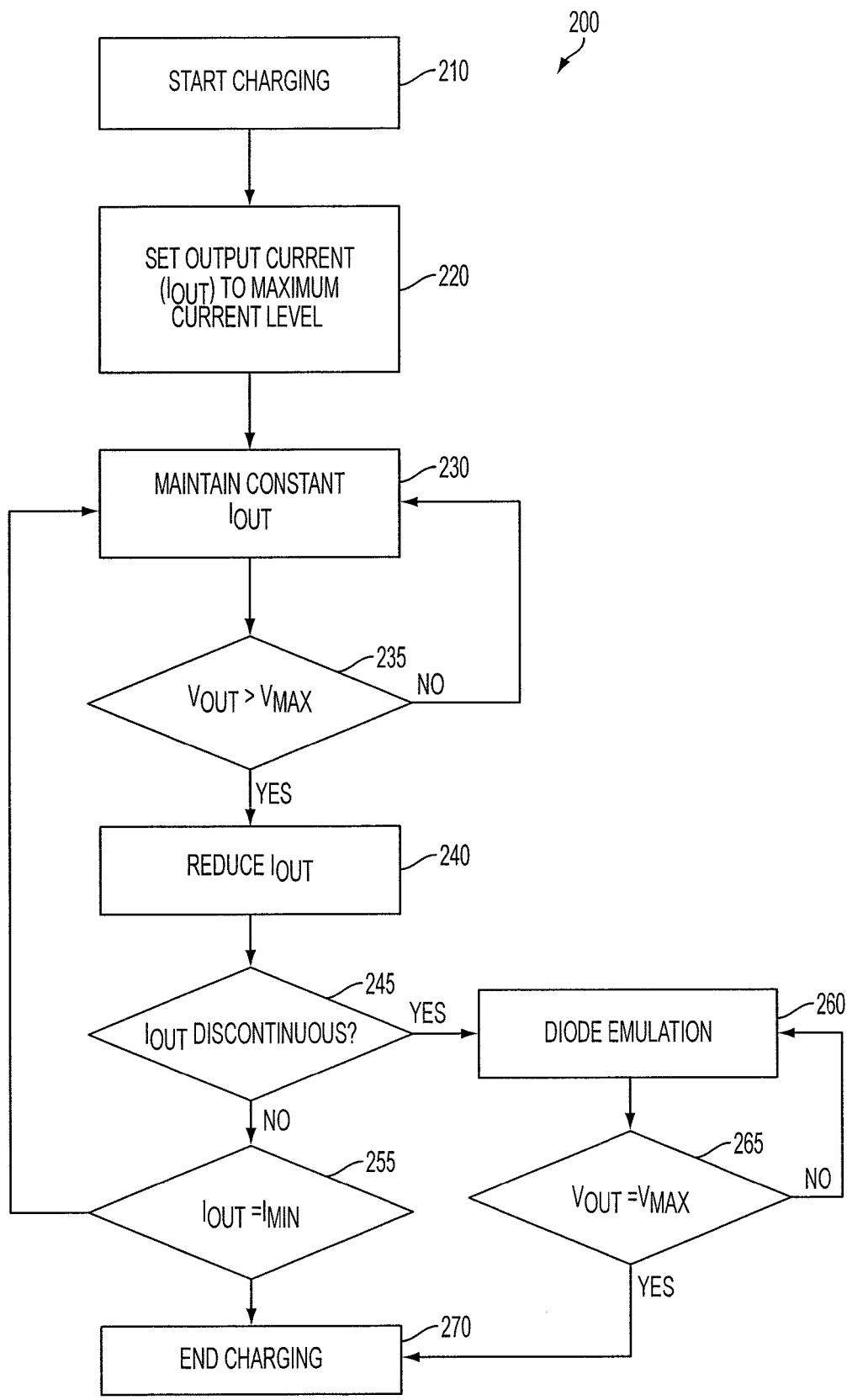
FIG. 2 is a flowchart illustrating a method of charging an energy storage device according to an embodiment of the present disclosure.

FIG. 2 is a flowchart 200 illustrating a method of charging an energy storage device according to an embodiment of the present disclosure. In particular, the flowchart 200 illustrates a method of operating the charging system 100 of FIG. 1. Thus, the discussion regarding FIG. 2 will refer to the components of FIG. 1.

At operation 210, a charging cycle may begin. For example, an electronic device including the charging system 100 may be plugged into an outlet or other device for providing power to charge the battery of the electronic device. In some embodiments, the power for charging may be received by a wireless power charging system, in which wireless power may be transferred from a wireless power transmitter to a wireless power receiver, such as through a mutual inductance relationship.

At operation 220, the output current ($I_{OUT}$) may be set to a maximum current level. At operation 230, the output current ($I_{OUT}$) may be maintained at a substantially constant current level. In addition, while the constant output current ($I_{OUT}$) is being applied, the output voltage ($V_{OUT}$) may increase to an overvoltage level during charging because of the relatively high effective series resistance (ESR) of the energy storage device 140. Thus, the output voltage ($V_{OUT}$) may be monitored and a determination may be made regarding whether the output voltage ($V_{OUT}$) is above a predetermined threshold.

At operation 235, if the output voltage ($V_{OUT}$) does not exceed the predetermined threshold, the output current ($I_{OUT}$) may continue to be maintained at the present level during operation 230. If, however, the output voltage ($V_{OUT}$) does exceed the predetermined threshold, the output current ($I_{OUT}$) may be reduced at operation 240. As will be discussed more fully below, the charging controller 130 may include a counter 520 (FIG. 5) that adjusts a count by one least significant bit (LSB) which steps the output current ($I_{OUT}$) down by a predetermined level. The predetermined amount that the output current ($I_{OUT}$) is reduced may be equal to $1/(2^N)$ of the maximum current level, wherein N is the number of bits in the counter 520. Additional details regarding an exemplary configuration of the charging controller 130 will be described below with reference to FIGS. 4 and 5.

At operation 245, it may be determined whether the output current ($I_{OUT}$) discontinuous. The output current ($I_{OUT}$) may become discontinuous when the output current ($I_{OUT}$) reaches a relatively low level for flowing through the inductor 126 of the switching voltage regulator 120. Thus, the current level for entering discontinuous mode may be at least partially depend on the sizing of the inductor 126. The discontinuous mode may be determined by monitoring the enablement of the transistors 122, 124 of the switching voltage regulator 120. For example, if the gate of the low-side transistor 124 is off when it is expected to be on, it is determined that the output current ($I_{OUT}$) is discontinuous.

If the output current ($I_{OUT}$) is not discontinuous, the charging controller 130 may determine whether the output current ($I_{OUT}$) is equal to the minimum current at operation 255. The minimum current ($I_{MIN}$) may be zero in some embodiments, while in other embodiments the minimum current ($I_{MIN}$) may be greater than zero. The minimum current ($I_{MIN}$) may be determined when the current is reduced $2^N$ number of times, again, where N is the number of bits in the counter 520 of the charging controller 130.

If the output current ($I_{OUT}$) is equal to the minimum current ($I_{MIN}$), the charging may end at operation 270. If, however, the output current ($I_{OUT}$) is not equal to the minimum current ($I_{MIN}$). the charging may continue to operation 230 and the new reduced output current ($I_{OUT}$) may be maintained as a constant current, after which the output voltage ($V_{OUT}$) may increase to above a predetermined voltage (detected at operation 235) and the output current ($V_{OUT}$) may be further reduced (operation 240), and so on.

If the output current ($I_{OUT}$) is discontinuous, the driver 110 may enter diode emulation at operation 250. During diode emulation mode, the driver 110 may shut off the drive to the switching voltage regulator 120—effectively disabling the transistors 122, 124. As a result, the charging system 100 may be protected from negative current from the switching voltage regulator 120. During diode emulation mode, the output voltage ($V_{OUT}$) measured when there is little to no current flowing. As a result, the output voltage ($V_{OUT}$) may be approximately the real voltage of the energy storage device 140, which may be read without the need to shut off the charging system 100.

At operation 265, it is determined whether the output voltage ($V_{OUT}$) is equal to the maximum desired voltage ($V_{MAX}$) for the energy storage device 140. The maximum desired voltage ($V_{MAX}$) may be based on a reference voltage ($V_{REF}$) set within the charging system 100. If the output voltage ($V_{OUT}$) is still less than the maximum desired voltage ($V_{MAX}$), the charging system 100 may continue in diode emulation mode (operation 260) to continue to charge the energy storage device 140 at a relatively low output current ($I_{OUT}$). If, however, the output voltage ($V_{OUT}$) reaches the maximum desired output voltage ($V_{MAX}$), the charging cycle may end at operation 270.

Figure 3:
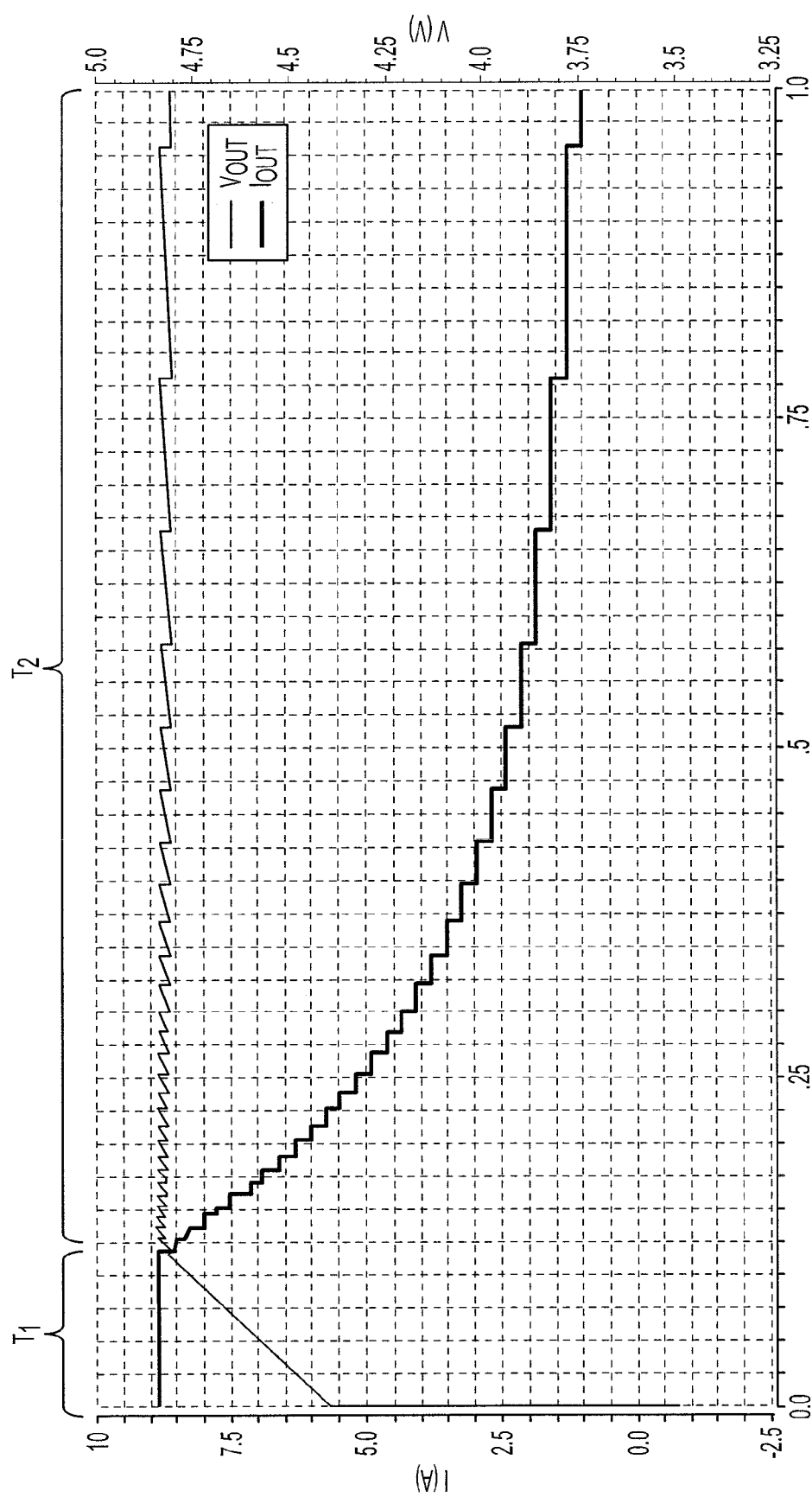
FIG. 3 shows a plot illustrating the output voltage ($V_{OUT}$) and output current ($I_{OUT}$) that may be generated during charging of an energy storage device.

FIG. 3 shows a plot 300 illustrating the output voltage ($V_{OUT}$) and output current ($I_{OUT}$) that may be generated during charging of an energy storage device. In particular, the plot 300 may result from the operation of the charging system 100 of FIG. 1. Thus, the discussion regarding FIG. 3 will refer to the output voltage ($V_{OUT}$) and output current ($I_{OUT}$) of FIG. 3 as well as the components of FIG. 1.

In a charging cycle (e.g., FIG. 2), the energy storage device 140 may be charged at maximum desired output current ($I_{OUT}$) until the output voltage ($V_{OUT}$) exceeds a predetermined threshold (e.g., maximum voltage). Because of the relatively high ESR of the energy storage device 140, the output voltage ($V_{OUT}$) may rise above the predetermined threshold before charging is complete. When the output voltage ($V_{OUT}$) exceeds the predetermined voltage threshold, the charging controller 130 may reduce the output current ($I_{OUT}$) by a predefined level. With the reduced output current ($I_{OUT}$), the output voltage ($V_{OUT}$) again may rise above the predetermined threshold ($V_{OUT}$) during charging. As a result, the output current ($I_{OUT}$) again may be reduced by a predefined level. The charging may continue with the output current ($I_{OUT}$) being reduced by a predefined level each time the output voltage ($V_{OUT}$) exceeds the predetermined threshold. Thus, the voltage plot for the output voltage ($V_{OUT}$) may have a generally saw-tooth shape that drops when the predetermined threshold is reached and the output current ($I_{OUT}$) is reduced. The current plot for the output current ($I_{OUT}$) may have a declining step shape that is constant between each instance that the output current is reduced by a predefined level to have a new level. The output current, therefore, may be decremented step-by-step causing the output voltage ($V_{OUT}$) to remain within a general range of the predetermined voltage once it is achieved.

Thus, for a first period (T1), the output current ($I_{OUT}$) may be set at a maximum current that is a constant output current ($I_{OUT}$), during which the output voltage ($V_{OUT}$) may increase toward a predetermined threshold. When the predetermined threshold is reached by the output voltage ($V_{OUT}$), the output current ($I_{OUT}$) may begin to decrease. During a second period (T2), the output voltage ($V_{OUT}$) may remain substantially constant near the predetermined threshold, during which time the output current ($I_{OUT}$) may be reduced by a predefined level each time the output voltage ($V_{OUT}$) reaches the predetermined threshold. The output current ($I_{OUT}$) may continue to be reduced until a minimum level for the output current ($I_{OUT}$) is reached. In some embodiments, the minimum level for the output current ($I_{OUT}$) may be zero, such that charging may be complete. In some embodiments, however, the minimum level for the output current ($I_{OUT}$) may be slightly greater than zero, such as in the event that the energy storage device 140 has a significant amount of leakage. In such a scenario, the lowest current level may be greater than zero—effectively operating in a trickle charging state. In addition, it is noted that over time the amount of time between each reduction of the output current ($I_{OUT}$) may increase over time. At the beginning of the charging cycle, there is short time (e.g., ½ second) between each decrement of the output current ($I_{OUT}$), whereas decrements of the output current ($I_{OUT}$) tend to have longer times therebetween.

In the plot 300, the values shown for the output current ($I_{OUT}$) and the output voltage ($V_{OUT}$) are for example purposes only and should not be viewed as limiting the disclosure to a particular range of values. It should be understood that the maximum current and maximum voltage for a charging cycle may depend, in part, on the type of energy storage device 140 being charged. For example, a battery may have a maximum charging current of about 0.3 A, whereas a supercapacitor may have a maximum charging current of about 8 A. Thus, the amount that the output current ($I_{OUT}$) is reduced during each step may also depend, somewhat, on the type of energy storage device 140 because the each step may be based on a fraction of the maximum charging current. The fraction may depend on the number of bits of a counter used to track each time the output voltage ($V_{OUT}$) reaches the predetermined level during a charging cycle.

Figure 4:
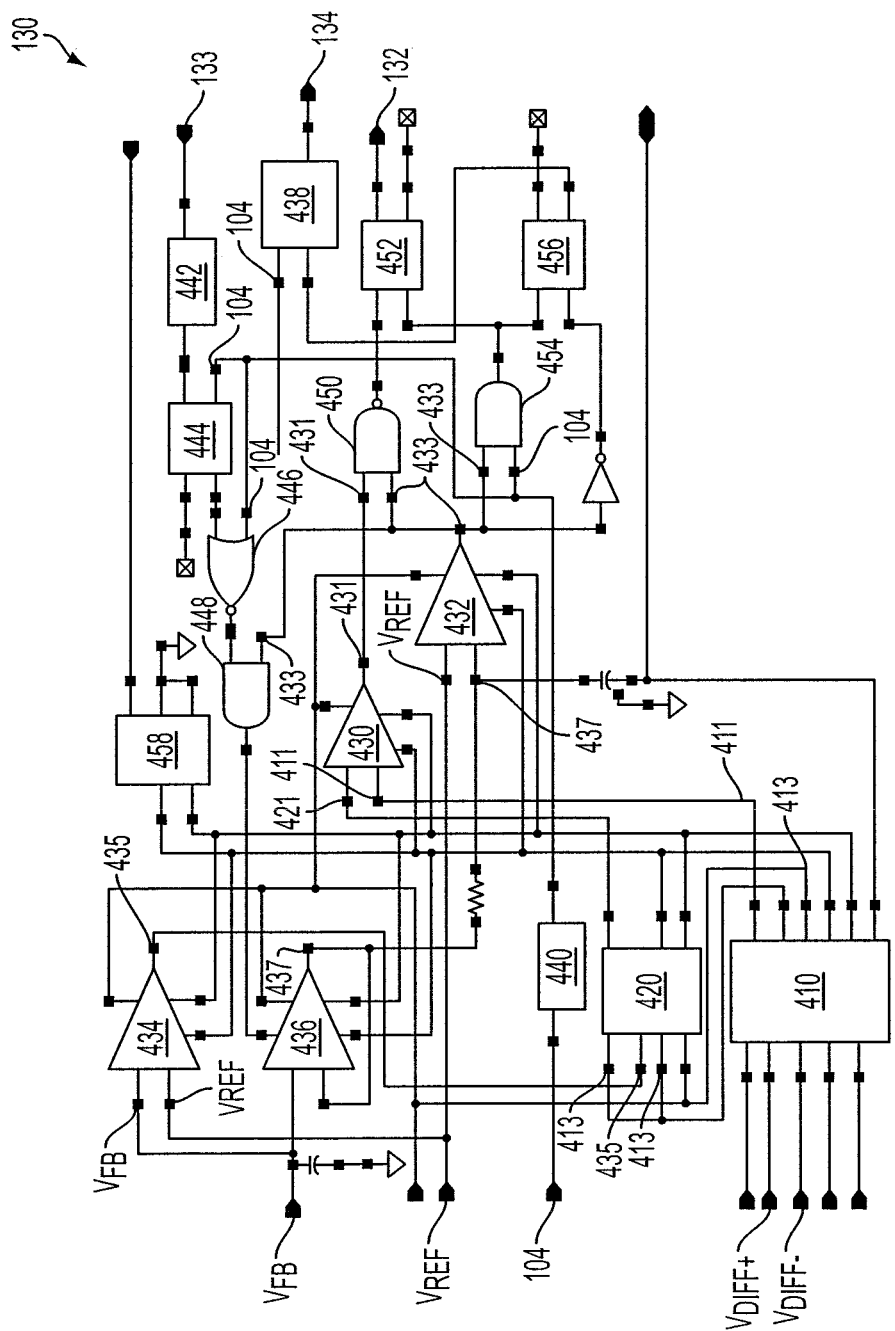
FIG. 4 is a block diagram of the charging controller of FIG. 1.

FIG. 4 is a block diagram of the charging controller 130 of FIG. 1. In particular, FIG. 4 shows an example of a configuration for the charging controller 130 according to an embodiment of the present disclosure. The charging controller 130 may include a current sense block 410, a digital-to-analog converter (DAC) foldback block 420, a peak comparator 434, a current control comparator 430, and a valley shutoff circuit. The valley shutoff circuit may include comparators 436, 432 that are further controlled by a trigger circuit including elements 442, 444, 446, and 448.

The current sense block 410 may include a current sense amplifier that is configured to sense the output current ($I_{OUT}$) and generate a current sense output signal 411 in response thereto. To sense the output current ($I_{OUT}$), the current sense block 140 may receive differential voltages ($V_{DIFF+}$, $V_{DIFF-}$) of the switching voltage regulator 120. As shown in FIG. 1, the output current ($I_{OUT}$) may be sensed from differential voltages ($V_{DIFF+}$, $V_{DIFF-}$) on the high-side of the switching voltage regulator 120. Of course, it is contemplated that any current sense configuration (e.g., high-side, low-side, etc.) may be used to sense the output current ($I_{OUT}$). The current sense block 410 may generate the current sense output signal 411 indicating a present level for the output current ($I_{OUT}$). The current sense output signal 411 may be a voltage signal that is the voltage difference between the differential voltages ($V_{DIFF+}$, $V_{DIFF-}$). The current sense output signal 411 may be sent to the DAC foldback block 420 to be used as the reference voltage used to determine what the present state of the output current ($I_{OUT}$). In other words, the current sense output signal 411 indicates a present level of the output current ($I_{OUT}$) to be fed back to the DAC foldback block 420 and used as a reference when the output current ($I_{OUT}$) is reduced.

The DAC foldback block 420 is configured to perform the digital control of the output current ($I_{OUT}$). The DAC foldback block 420 is coupled to the current sense block 410 to receive the current sense output signal 411 indicated the present level of the output current ($I_{OUT}$). The DAC foldback block 420 may also receive another signal 435 indicating a present level of the output voltage ($V_{OUT}$), such as a pulse that is generated when the output voltage ($V_{OUT}$) exceeds the predefined threshold. The DAC foldback block 420 generates a DAC foldback output signal 421 based on the count value, which, in turn indicates the reference level for the output current ($I_{OUT}$). Further detail will be provided about the DAC foldback block 420 with respect to FIG. 5.

The peak comparator 434 is configured to receive and compare the feedback voltage ($V_{FB}$) and the voltage reference ($V_{REF}$). The voltage reference ($V_{REF}$) received by the peak comparator 434 may define the predefined threshold that determines the desired maximum voltage for the output voltage ($V_{OUT}$). As discussed above, the feedback voltage ($V_{FB}$) may be the output voltage ($V_{OUT}$) itself, in which case the voltage reference ($V_{REF}$) may be equal to the maximum desired voltage for the output voltage ($V_{OUT}$). In some embodiments, however, the feedback voltage ($V_{FB}$) may be a voltage that is based on the output voltage ($V_{OUT}$) (e.g., from a voltage divider), in which case the voltage reference ($V_{REF}$) may be another voltage. In either case, the voltage reference ($V_{REF}$) may be used by the peak comparator 434 to determine if the output voltage ($V_{OUT}$) has exceeded the predetermined threshold. If the output voltage ($V_{OUT}$) exceeds the predetermined threshold (i.e., $V_{FB} > V_{REF}$), the peak comparator 434 may generate an output signal that is sent to the DAC foldback block 420.

The current control comparator 430 may be configured to perform the dynamic current control for the charging controller 130. For example, the current control comparator 430 may receive the DAC foldback output signal 421 from DAC foldback block 420. The DAC foldback output signal 421 may be an analog voltage signal that is used as a reference signal to generate the PWM signal 132 that drives the driver 110 to control the output current ($I_{OUT}$) to a desired level. The current control comparator 430 may also receive the current sense output signal 411 from the current sense block 410. The current sense output signal 411 may have a value that represents the present (i.e., real-time) value of the output current ($I_{OUT}$) as determined by the current sense block 410. The current sense output signal 411 may likewise be an analog voltage signal that is a difference between differential voltages ($V_{DIFF+}$, $V_{DIFF-}$). The current control comparator 430 may be configured to compare the DAC foldback output signal 421 and the current sense output signal 411, the result of which controls the PWM signal 132 (through a NAND gate 550 and a latch 452). The PWM signal 132 may be received by the driver 110 (FIG. 1) to determine the switching frequency for the drive signals to cause the desired output current ($I_{OUT}$) to be generated by the switching voltage regulator 120. As a result, reference used in the feedback loop for controlling the output current ($I_{OUT}$) may be generated by the DAC foldback block 420.

The valley shut off circuit may include the comparator 436 and the comparator 432 as controlled by the elements 442, 444, 446, 448. The valley shut off circuit may be configured to determine the valley voltage for the output voltage ($V_{OUT}$). The comparator 436 may be a sample and hold amplifier that is configured as a buffer amplifier for the feedback voltage ($V_{FB}$). Thus, the comparator 436 may be referred to as a sample and hold comparator 436. The sample and hold comparator 436 may be sampled as controlled by the valley control elements 442, 444, 446, 448 to generate the output signal 437 of the sample and hold comparator 436 to be sent to a valley shut off comparator 432. The valley shut off comparator 432 may be a Schmitt comparator because the sample and hold comparator 436 may have excess noise. In some embodiments, a single comparator may be configured to compare the reference voltage (VREF) and the feedback voltage (VFB) in a manner that is sampled as described herein.

The control elements 442 (e.g., monostable circuit), 444 (e.g., latch), 446 (NOR gate), 448 (AND gate) may control the gate for the sample and hold comparator 436. For example, the monostable circuit 442 may receive a gate indication signal 133 from the driver 110. The gate indication signal 133 may be used to monitor the operation of the lower gate for the low-side transistor 124. When the lower gate turns off the low-side transistor 124, a pulse is received from the gate indication signal 133. If the low-side transistor 124 is disabled when it actually should be enabled (indicated with a logic 1 for signal 433), it may be determined that the output current ($I_{OUT}$) is discontinuous. In addition, the sample and hold comparator 436 may be triggered and enabled by the output of the AND gate 448. As a result, the sample and hold comparator 436 may sample the feedback voltage ($V_{FB}$) to be sent to the valley shut off comparator 432.

When the sample and hold comparator 436 is triggered and transmits the feedback voltage ($V_{FB}$) to the valley shut off comparator 432, the feedback voltage ($V_{FB}$) is the approximately true voltage of the energy storage device 140 (i.e., the valley voltage). The valley shut off comparator 432 may compare the feedback voltage ($V_{FB}$) with the reference voltage ($V_{REF}$). If the feedback voltage ($V_{FB}$) is below the reference voltage ($V_{REF}$), the valley shut off comparator 432 continues to enable the PWM signal 132 to control the driver 110 to operate in diode emulation mode. If, however, the feedback voltage ($V_{FB}$) is high enough such that the feedback voltage ($V_{FB}$) is approximately equal to the reference voltage ($V_{REF}$), the valley shut off comparator 432 may disable the PWM signal 132 through the AND gate 454. As a result, the charging controller 130 may monitor the valley voltage (i.e., the output voltage ($V_{OUT}$) during discontinuous mode) without shutting off the charging system 100 while the valley voltage remains below the desired maximum voltage for the energy storage device 140. In some embodiments, the peak voltage and the valley voltage detection may be combined into one comparator, such that a single comparator monitors both the peak and valley voltages. The monostable circuit 440 receives the clock signal 104 used to set the frequency of the PWM signal 132. The monostable circuit 440 sends a relatively short pulse to retrigger the system. As a result, the charging controller 130 operates the charging system 100 as a fixed frequency hysteretic system that gates the PWM signal 132 and generates a constant current with a fixed frequency.

A ready timer 438 may also be coupled with the valley shut off comparator 432 through latch 456. The ready timer 438 may be configured to monitor the valley shut off comparator 432 to determine if the charging is stopped for a predetermined number of clock cycles before transmitting a charge complete signal 134 to the driver 110 to verify that the charging is complete rather than there merely being a pulse missing. If the valley shut off comparator 432 is a Schmitt comparator, the Schmitt comparator may be held off until the voltage drops a substantial amount, thus ensuring the that enough cycles are missing for the ready timer to generate the charge complete signal 134.

Figure 5:
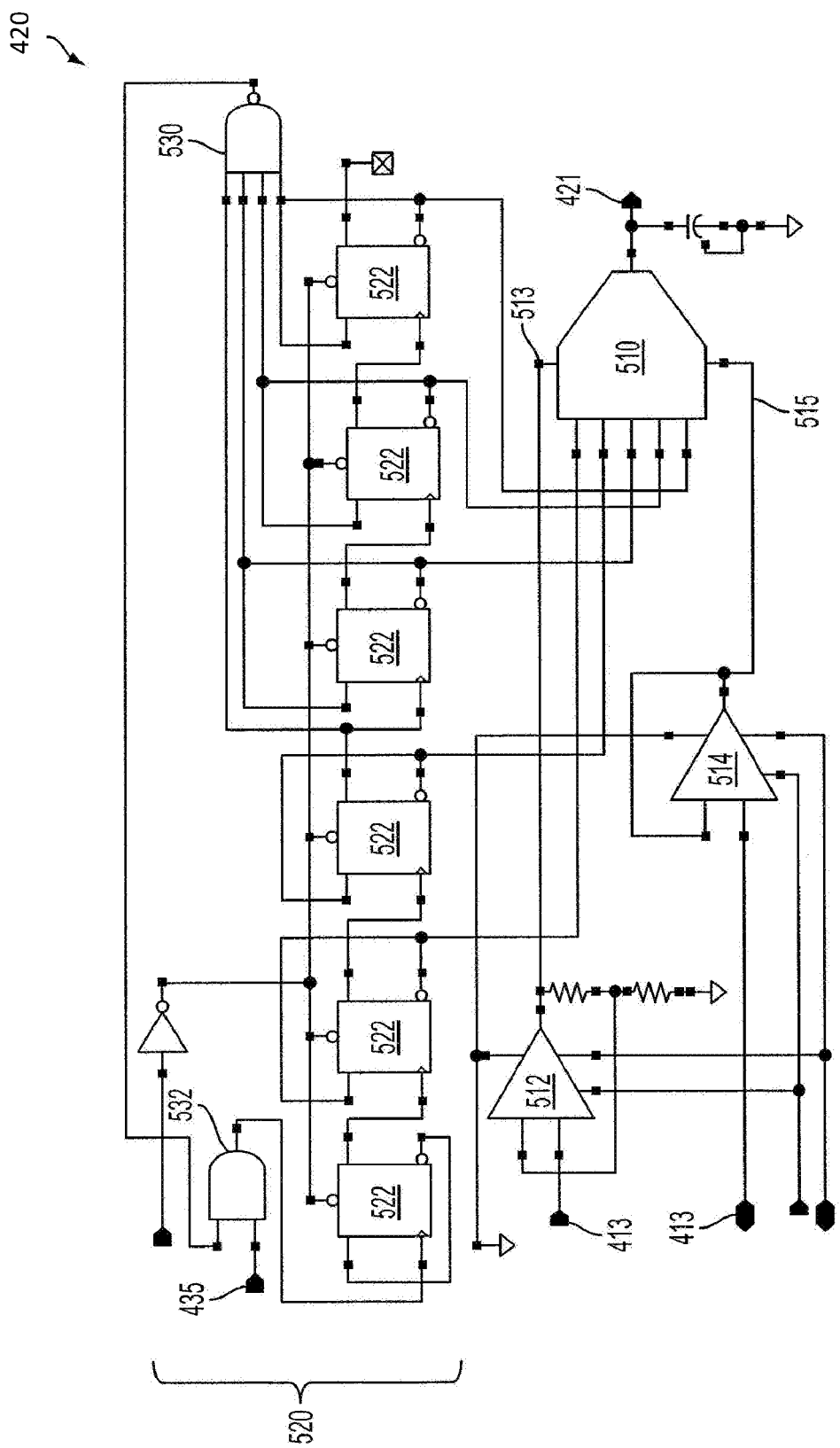
FIG. 5 is a schematic block diagram of the DAC foldback block of FIG. 4.

FIG. 5 is a schematic block diagram of the DAC foldback block 420 of FIG. 4. In particular, FIG. 5 shows an example of a configuration for the DAC foldback block 420 according to an embodiment of the present disclosure.

The DAC foldback block 420 may include a digital-to-analog converter (DAC) 510 coupled to a counter 520 to receive a count value that is received by the inputs to the DAC 510. The DAC foldback block 420 may further include amplifiers 512, 514 that may be configured to drive the DAC 510 by providing an upper level 513 and a lower level 515 for the DAC 510. The DAC 510 may, therefore, have a narrow range with the upper level 513 and the lower level 515 may be approximately the same or have a small offset (e.g., 1V and 1.5V). In FIG. 5, the upper level 513 and the lower level 515 are the same because they each receive the same reference voltage 413 from the current sense block 410.

The counter 520 may be configured to drive the DAC 510. In particular, the counter 520 may be configured to begin counting from a first value that translates to a maximum output current ($I_{OUT}$) value for the charging system 100 (FIG. 1). The counter 520 may receive the feedback voltage pulse 435 from the peak comparator 434 (FIG. 4). As discussed above, the feedback voltage pulse 435 may be generated by the peak comparator 434 when the output voltage ($V_{OUT}$) exceeds the predetermined threshold. Otherwise, the feedback voltage pulse 435 may not be generated and the counter 520 remains unchanged. As a result, the charging system 100 maintains the output current ($I_{OUT}$) at its present level. The AND gate 532 may receive the feedback voltage pulse 435 such that when no feedback voltage pulse 435 is generated (e.g., a zero), the clock to the first register 522 is disabled—causing the counter 520 not to change the count value. In other words, the counter 520 may include a series of registers 522 that are configured such that each feedback voltage pulse 435 received from the peak comparator 434 ripples through the counter 520 and causes the state of the counter to be adjusted one least significant bit at a time. The counter 520 may be configured to increment with each feedback voltage pulse 435 or decrement with each feedback voltage pulse 435.

The DAC 510 may receive a bit from each of the registers 522. In some embodiments, the first register 522 may not have send a bit to the DAC 510. As a result, the first register 522 may be a filter such that it may require two feedback voltage pulses 435 to adjust the count value because of an overvoltage state, which may result in a reduced number of falsely triggered counts. Thus, for the embodiments shown in FIG. 5, the DAC 510 may be a 5 bit DAC that receives a bit from each of the registers 522 (with exception of the first register 522 in this example). Additional filtering is contemplated as well to further improve reliability.

With each adjustment in the counter 520, the DAC foldback output signal 421 is reduced. Because the DAC foldback output signal 421 is used as a reference for the current sense output signal 411 the output current ($I_{OUT}$) may also be reduced. Each step of the output current may be reduced according to a fraction that is related to the number of bits in the DAC 510. For example, each reduction may be $\frac{1}{2^N}$ of the maximum current, which in the case of a 5 bit DAC 510 is $\frac{1}{32} \ast I_{MAX}$ for the value that the output current ($I_{OUT}$) is decremented each time the output voltage exceeds the predetermined threshold.

The DAC foldback output signal 421 may be reduced until a minimum current level is reached. For example, the upper most significant bits (MSBs) may be input into a NAND gate 530, the output of which is input into the AND gate 532 that receives the feedback voltage pulses 435. As a result, the counter 520 may stop incrementing. In another embodiment, the minimum current (i.e., stop current) may be detected by programmable register to compare the counter to a digital code. If the counter output matches the digital code, the stop current may be detected.

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the disclosure. In addition, features from one embodiment may be combined with features of another embodiment while still being encompassed within the scope of the disclosure as contemplated by the inventor.

What is claimed is:

1. A charging system, comprising:
   a charging controller configured to:
   generate a control signal indicating a first level of an output current generated by a switching voltage regulator for charging an energy storage device;
   determine that an output voltage exceeded a predetermined threshold; and
   generate the control signal indicating a new level of the output current that is reduced from the first level;
   a driver coupled with the charging controller, the driver configured to receive the control signals and generate a plurality of switching control signals; and
   valley shut off circuitry operably coupled with an output latch configured to transmit the control signals to the driver, wherein the valley shut off circuitry is configured to shut off the control signal when the output current is discontinuous.

2. The charging system of claim 1,
   wherein the switching voltage regulator is operably coupled with the driver, the switching voltage regulator configured to receive the plurality of switching control signals and to generate the output current and output voltage in response thereto.

3. The charging system of claim 2, wherein the switching voltage regulator includes at least one of a buck voltage converter topology and a buck/boost voltage converter topology.

4. The charging system of claim 1, wherein the charging controller includes:
   a current sense block configured to sense a real-time current level of the output current and generate a current sense output signal in response thereto; and
   a digital-to-analog converter (DAC) foldback block configured to generate a DAC foldback output signal indicating the new level of the output current.

5. The charging system of claim 4, wherein the charging controller further includes a current control comparator operably coupled with the current sense block and the DAC foldback block to receive the current sense output signal and the DAC foldback output signal.

6. The charging system of claim 5, wherein the current control comparator is configured to generate the control signal based on a comparison of the current sense output signal and the DAC foldback output signal.

7. The charging system of claim 6, wherein the DAC foldback block includes a counter operably coupled with a digital-to-analog converter configured to generate the DAC foldback output signal to decrement in response to a determination that the output voltage exceeded a predetermined threshold.

8. The charging system of claim 1, wherein the valley shut off circuitry is configured to transmit the control signal from a current control comparator to the driver.

9. The charging system of claim 1, wherein the valley shut off circuitry is further configured to monitor the output voltage while the output current is discontinuous and generate a charging complete signal when the output voltage reaches a desired maximum charging voltage.

10. A charging system, comprising
    a charging controller including a plurality of mixed analog and digital circuits configured to monitor an output voltage and an output current from an energy storage device, and control a switching voltage regulator to reduce the output current in response to the output voltage exceeding a predetermined threshold;
    a driver coupled with the charging controller, the driver configured to receive control signals from the charging controller and generate a plurality of switching control signals to the switching voltage regulator; and
    valley shut off circuitry operably coupled with an output latch configured to transmit the control signals to the driver, wherein the valley shut off circuitry is configured to shut off the control signal when the output current is discontinuous.

11. The charging system of claim 10, wherein the charging controller is configured to control the switching voltage regulator to reduce the output current, the charging controller generating a control signal to control the switching voltage regulator to decrement the output current step-by-step each time the output voltage exceeds the predetermined threshold.

12. The charging system of claim 11, wherein the control signal is a pulse-width modulation (PWM) control signal.

13. The charging system of claim 12, further comprising an electronic device including the energy storage device, the switching regulator, and the charging controller.

14. The charging system of claim 12, wherein the energy storage device is selected from the group consisting of a capacitor and a battery.

15. The charging system of claim 12, wherein the capacitor includes at least one of a supercapacitor and an electrolytic capacitor.

16. A method of controlling charging of an energy storage device, the method comprising:
   monitoring an output voltage charging an energy storage device;
   comparing a reference signal and a current sense signal to generate a pulse-width modulation (PWM) control signal that determines an output current for a switching voltage regulator generating the output voltage;
   decrementing the reference signal in response to the output voltage exceeding a predetermined level for a maximum charging voltage for the energy storage device;
   detecting that the output current is in a discontinuous mode; and
   setting the control signal such that the output current is a minimum current when the output current is discontinuous.

17. The method of claim 16, wherein decrementing the reference signal includes adjusting a counter responsive to a feedback voltage pulse generated when the output voltage exceeds the predetermined level for the maximum charging voltage for the energy storage device.

18. The method of claim 16, further comprising detecting that the output current is in a discontinuous mode.

19. The method of claim 17, further comprising monitoring an actual voltage of the energy storage device while the output current is in the discontinuous mode.

20. A method of charging an energy storage device, the method comprising:
   generating a charging output current as a constant current with a switching voltage regulator during a first period while a charging output voltage rises;
   decrementing the charging output current during a second period, wherein decrementing occurs in a step-by-step manner responsive to the charging output voltage rising above a predetermined threshold;
   detecting that the output current is in a discontinuous mode; and
   setting the control signal such that the output current is a minimum current when the output current is discontinuous.

* * * * *